United States Patent [19]

Aizu

[11] 4,196,910
[45] Apr. 8, 1980

[54] SHAFT SEALING DEVICE FOR TURBOCHARGER

[75] Inventor: Shoichi Aizu, Sakura, Japan

[73] Assignee: Ishikawajima-Harima Jukogyo Kabushiki Kaisha, Ote, Japan

[21] Appl. No.: 913,113

[22] Filed: Jun. 6, 1978

[30] Foreign Application Priority Data

Dec. 7, 1977 [JP] Japan ............................ 52-64333[U]
Apr. 18, 1978 [JP] Japan ............................ 53-50933[U]

[51] Int. Cl.² .............................................. F16J 15/40
[52] U.S. Cl. .................................. 277/59; 277/72 R; 415/111; 417/407
[58] Field of Search ..................... 277/59, 24, 53, 71, 277/72 R, 79, 133, 134, 168, 170–172; 415/111, 112, 115; 417/407

[56] References Cited

U.S. PATENT DOCUMENTS

| | | | |
|---|---|---|---|
| 2,529,880 | 11/1950 | McClure | 277/72 X |
| 3,310,230 | 3/1967 | Wirth | 277/59 X |
| 3,411,706 | 11/1968 | Woollenweber et al. | 417/407 |
| 3,588,124 | 6/1971 | Guinard | 277/59 X |
| 3,917,288 | 11/1975 | Huber et al. | 277/59 |
| 3,957,274 | 5/1976 | Lang | 277/59 X |
| 3,961,867 | 6/1976 | Woollenweber | 417/407 |
| 4,009,972 | 3/1977 | Sarle | 417/407 |

FOREIGN PATENT DOCUMENTS

| | | | |
|---|---|---|---|
| 569022 | 11/1957 | Italy | 415/111 |
| 1212335 | 11/1970 | United Kingdom | 277/71 |

Primary Examiner—Robert S. Ward, Jr.
Attorney, Agent, or Firm—Scrivener, Parker, Scrivener and Clarke

[57] ABSTRACT

A shaft sealing device for a turbocharger wherein seal rings are disposed between a shaft and a bearing casing and in order to lower the high pressure gas which passes through the seal ring to a low pressure, a small chamber in communication with the exterior is formed, whereby the gas leakage into the bearing casing may be reduced as much as possible.

1 Claim, 13 Drawing Figures

SHAFT SEALING DEVICE FOR TURBOCHARGER

DESCRIPTION OF THE PRIOR ART

The present invention relates to a shaft sealing device for use in an exhaust gas turbocharger for an internal combustion engine and more particularly a shaft sealing device for a turbocharger which may make the leakage of gas into a bearing casing an extremely small amount, thereby increasing reliability and a lifetime.

In the conventional turbochargers, various types of shaft sealing device have been devised and used. Especially in case of a small-sized radial turbine type turbocharger, there are problems of capability and endurance of sealing oil and gas of a shaft sealing device so that their improvements have been desired. An example of a general, small-sized radial turbine type turbocharger is shown in FIG. 1. As shown in FIG. 1, a shaft 1 having a turbine wheel 2 welded at one end thereof and having a blower impeller 3 joined with a nut 4 at the other end thereof is rotatably supported by bearings 5 held in a bearing casing 6, and flanges 7 and 8 are formed at both ends of the bearing casing 6. One end of the bearing casing 6 is joined through the flange 7 to a turbine casing 9 while the other end is joined through the flange 8 to a blower casing 10. A seal ring 11 is disposed in a groove on the side of the turbine of the shaft 1 and is made into contact with and supported by the bearing casing 6, thereby constituting a shaft sealing device for sealing the gas within the turbine casing 9. A seal ring 12 is disposed within a groove on the side of the blower of the shaft 1 and is made into contact with and supported by a blower mounting flange 13, thereby constituting a shaft sealing device for sealing the air within the blower casing 10. 14 is a turbine nozzle portion; 15 is a gas inlet port; 16 is a gas exhaust port; 17 is an air inlet port; 18 is an oil supply port and 19 is an oil discharge port.

A general circuit for using the turbocharger constructed and arranged as described above in a diesel engine will be described with reference to FIGS. 2 and 3. FIG. 2 shows a case of an engine for an vehicle except one not provided with an exhaust gas brake, and FIG. 3 is used mainly for a vehicle wherein a gas outlet pipe line rear of the turbocharger is throttled so that the so-called exhaust gas brake action is provided.

In FIGS. 2 and 3, 20 is a turbocharger and 21 is an engine. The circuit is such that air is supplied through the blower impeller 3 to the engine 21 and the gases discharge from the engine 21 is discharged through the turbine wheel 2. In FIG. 2 a throttle valve 23 is disposed in this exhaust pipe 22. In both circuits, the gases which have reached from the engine 21 to the turbine casing 9 (See FIG. 1) expand at the turbine nozzle portion 14 (See FIG. 1), and after having flown into the turbine wheel 2, the gases further continue to expand, decreasing the pressure and are discharged from the outlet of the turbine casing 9 through the turbine exhaust pipe 22 into the atmosphere.

In this case, the pressure which is slightly lower than at the inlet portion of the turbine wheel 2 is exerted to the shaft seal portion on the side of the turbine on the lateral surface on the side of the turbine wheel 2 of the seal ring 11. The pressure on the lateral side on the side of the bearing of the seal ring 11 is substantially equal to the pressure in the bearing casing 6 and to the atmospheric pressure so that this pressure difference is increased in proportion to a load on the engine and an air charging pressure (mean effective pressure).

For example, in case of a high-speed diesel engine with a brake mean effective pressure of 15 kg/cm$^2$, the turbine inlet pressure is 1.9 kg/cm$^2$ G and the pressure on the side of the turbine on the seal ring portion is about 1.2 kg/cm$^2$ G. In case of an engine for a vehicle, when the exhaust gas brake is applied, the seal portion pressure becomes 2–3 kg/cm$^2$ G. Because of this pressure difference between the both sides of this seal ring, the gases leak into the bearing casing side through the space between seal ring and the ring groove and the space of the seal ring gap, and the forces act on the seal ring in the axial direction. As a result, the higher the air charging pressure, the greater the amount of gas leakage becomes in case of the conventional seal construction, and there are problems that the bearing portions are contaminated; the seal ring is made into contact with the shaft, generating heat and being worn and thus losing the tension and the clearance is increased, resulting in degradation in durability and sealability.

In order to attain effective sealings, the following conditions must be satisfied. That is, it is important that
(1) clearance between a seal ring and a ring groove in a shaft must be reduced as practically as possible, and
(2) the pressure difference between the front and rear sides of the seal ring must be reduced as practically as possible.

In order to prevent the wear of the seal ring, it is required that
(3) the gas pressure difference across the seal ring be reduced so that the contact of the seal ring with the shaft may be avoided or even if the contact is unavoidable, the contact pressure must be minimized, and
(4) the displacement of the seal ring must be physically limited so as to avoid the contact between the seal ring and the shaft.

Because the recent increase in air charging pressure and the use of a turbocharger for a vehicle, the conventional seal constructions can hardly satisfy the above conditions so that the above described problems arise.

Next the following constructions of the turbine-side shaft sealing devices using the seal rings that have been devised and demonstrated are used. (A) FIG. 4(A) shows that a seal ring c which is disposed between a shaft a and a bearing casing b is permitted to move axially toward the inner wall of the bearing casing b and the seal ring c is located in a ring groove d in the shaft a.

With this construction, the movement in the axial direction of the seal ring c is free so that the sealing performance is better, but when the gas pressure on the side of the turbine rises, the seal ring c is moved toward the bearing and is made into contact with the ring groove d in the shaft a so that the seal ring c looses its tension and the wear of the seal ring c and the ring groove d occurs at I, resulting in degradation of sealing performance and durability. (B) FIG. 4(B) shows a construction in which the inner wall of the bearing casing b is formed with a small diameter step so that the seal ring c which is interposed between the bearing casing b and the shaft a may be prevented from the axial displacement toward the bearing side.

With this construction, when the gas pressure which acts in the direction indicated by an arrow is high, the displacement of the seal ring c is prevented by the step formed on the side of the low pressure in the bearing casing b, but in order to reduce the space between the seal ring c and the ring groove d, machining and dimensional tolerances of the associated parts are very severe; lubricating oil from the bearing portion adheres to a portion II, thereby deteriorating sealing effect; and consequently the seal ring c is made into contact with the ring groove d in the shaft a, resulting in wear at a portion III and degradation in durability. (C) FIG. 4(C) shows a construction wherein in the construction shown in FIG. 4(B) a separate member is disposed on the bearing casing b and a step is formed on the high pressure side of the bearing casing b.

With this construction, the defects of both the systems of said (A) and (B) may be covered, but in order to reduce the space between the seal ring c and the ring groove d in the shaft a, machining and dimensional tolerances become very severe so that practical uses are difficult. (D) FIG. 4(D) shows a construction in which two seal rings c and c' are spaced apart from each other by a predetermined distance between the shaft a and the bearing casing b and both are movable in the axial direction of the bearing casing b.

With this construction, as with said (A), sealing performance is better, but when the gas pressure on the side of the turbine rises, the seal rings c and c' are made into contact with the ring groove d in the shaft a so that they loose their tension and the wear of the seal rings and the ring grooves tends to occur at portions I and IV, resulting in degradation of sealing performance and durability. (E) FIG. 4(E) shows a construction wherein FIGS. 4(B) and (D) are combined in order to cover the defects of both.

With this construction, when the gas pressure on the side of the turbine rises, the gas pressure between the seal rings c and c' rises and the seal ring c' is moved toward the low pressure side and is made into contact with the ring groove d in the shaft a. As a result, wear of the seal ring and the ring groove occurs at the portion I: and the seal ring c' loses its tension, resulting again the degradation in sealing performance and durability. (F) FIG. 4(F) shows a construction wherein the idea of FIG. 4(B) is applied to the construction of FIG. 4(E).

With this construction, the machining tolerances of the associated parts become more severe than in the system of said (B). Furthermore because of the same reason as the system(B), adhesion of lubricating oil at the portion I of the seal ring c' and contact at the portion III occur so that sealing performance and durability tend to be degraded.

As described above, the prior art shaft sealing devices all have the problems.

The present invention therefore has for its object to reduce the leakage of gas into a bearing casing and to avoid the wear and decrease in tension of ring due to the contact between a seal ring on the side of a turbine and a shaft, thereby increasing sealing performance and durability of the seal ring and thus eliminating the defects encountered in the conventional sealing devices.

The device in accordance with the present invention will be described with reference to the accompanying drawing.

FIGS. 1 through 4 of the accompanying drawings show the prior art while FIGS. 5-8 show the device in accordance with the present invention. That is, FIG. 1 is a longitudinal sectional view of an example of a radial turbine type small-sized turbocharger;

Figure 5:
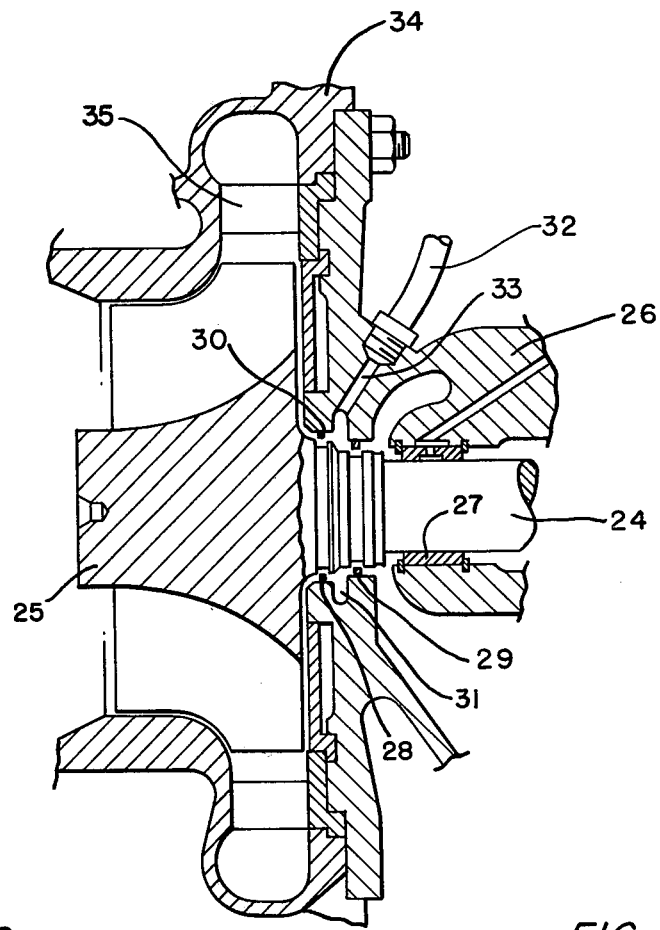
Figure 6:
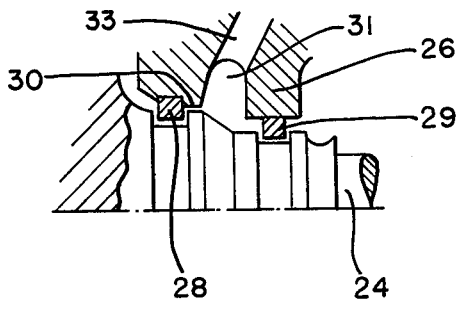
Figure 7:
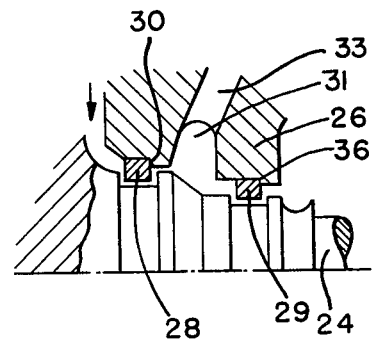
Figure 8:
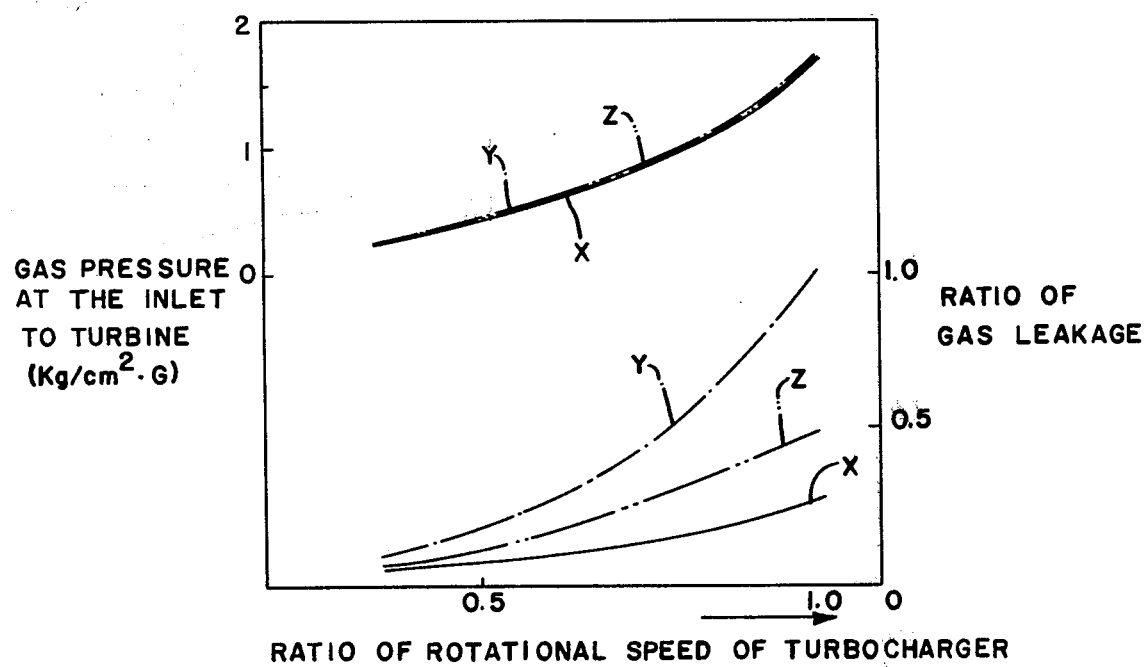

FIGS. 4(A)-(F) are schematic views each illustrating a construction of a prior art shaft sealing device;

FIG. 5 is a longitudinal sectional view illustrating one preferred embodiment of a device in accordance with the present invention;

FIG. 6 is a fragmentary view, on enlarged scale, of FIG. 5;

FIG. 7 shows another embodiment of a device in accordance with the present invention and is a longitudinal sectional view corresponding to FIG. 6; and FIG. 8 is a graph illustrating the experimental results of the present invention and the prior art.

One preferred embodiment of the present invention will be described with reference to FIG. 5 and FIG. 6 which shows a part of FIG. 5 on enlarged scale.

Figure 1:
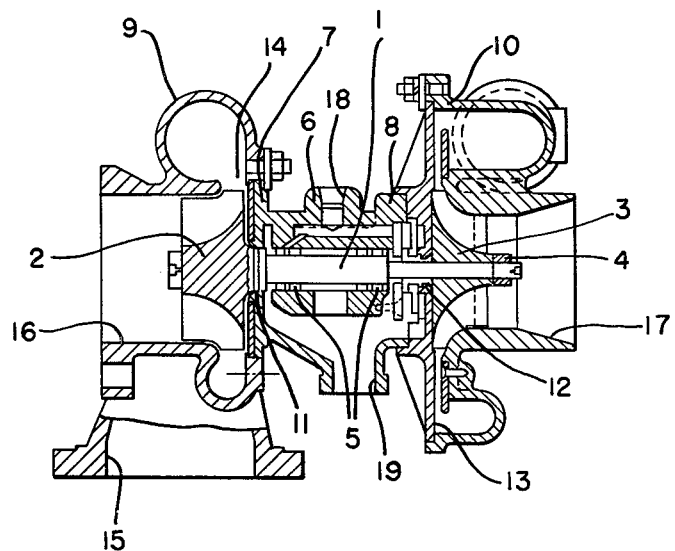
Figure 2:
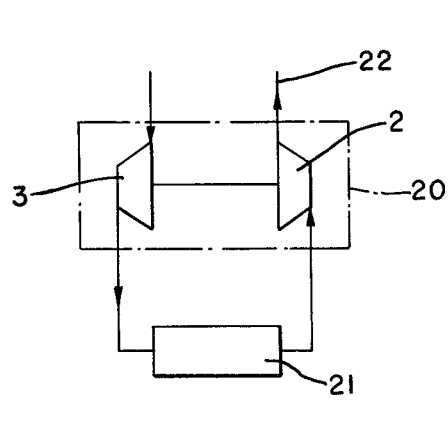
FIG. 2 is a system diagram of an example of a circuit wherein a turbocharger is used with a diesel engine.
Figure 3:
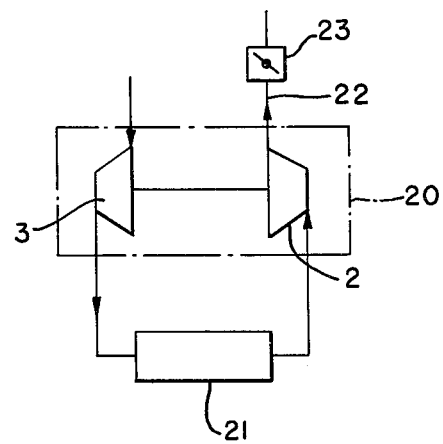
FIG. 3 is a system diagram showing an example different from FIG. 2.
Figure 4:
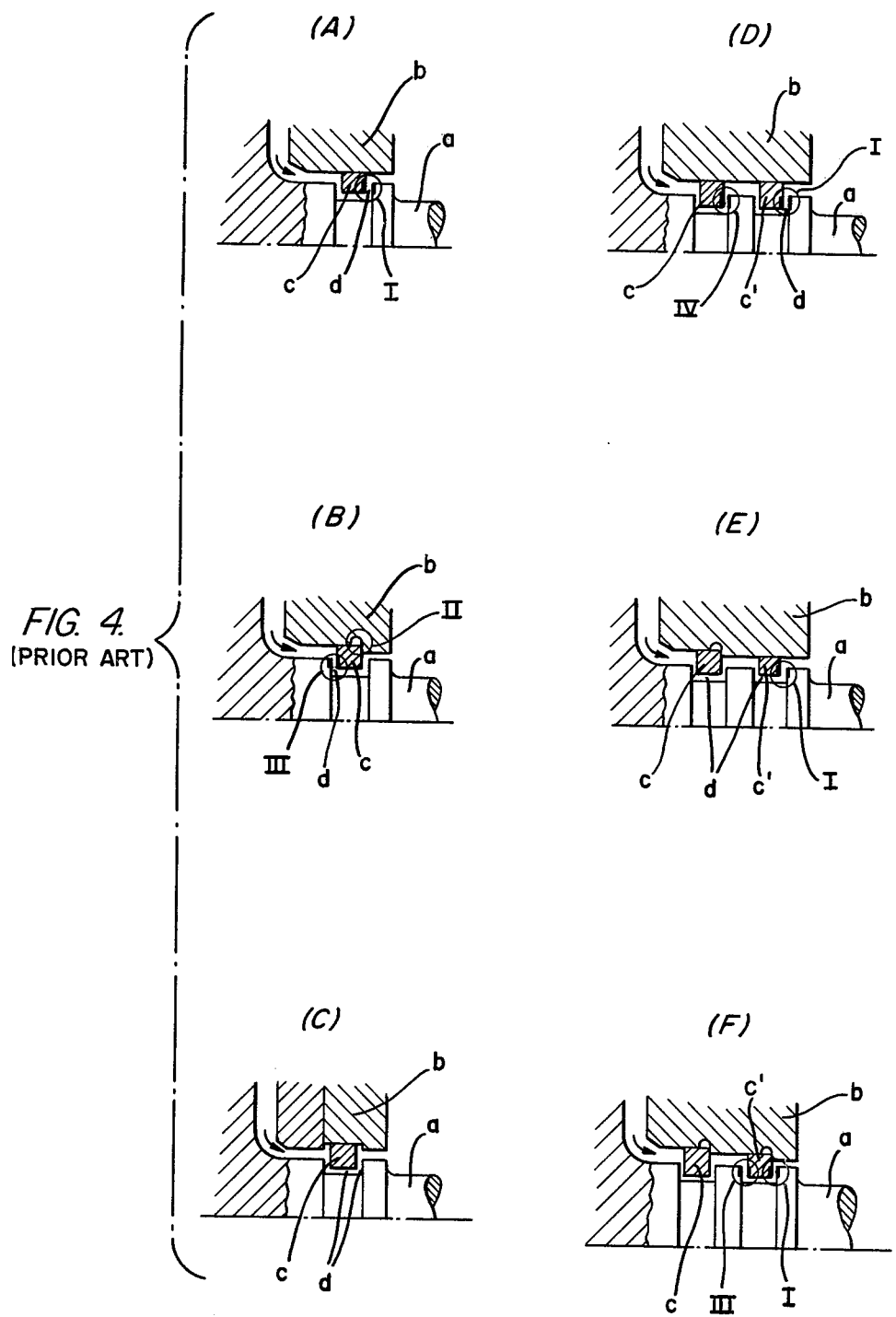

In FIGS. 5 and 6, 24 is the shaft same with one shown in FIG. 1 as 1 and in FIG. 4 as a and is similar in construction to the prior art shaft. That is, it is rotatably supported by a bearing 27 which in turn is held in a bearing casing 26, and a turbine wheel 25 is joined by welding integrally of the shaft 24 at one end thereof.

Two seal rings 28 and 29 are located between the said shaft 24 and the bearing casing 26 and spaced apart from each other by a predetermined distance in a manner described below. That is, a step 30 with a diameter smaller than a mounting dimension of the seal ring 28 is formed in the wall of the bearing casing 26 which is supporting the seal ring 28 located on the side of the turbine wheel 25, thereby limiting the displacement of the seal ring 28 toward the bearing 27. The inner diametric dimension of the wall of the bearing casing 26 which supports the seal ring 29 (smaller in diameter than the seal ring 28) located on the low pressure side (that is, opposite to the turbine side) from said step 30 is determined equal to the mounting dimension of the seal ring 29 (which is equal to the outer dimension of the seal ring 29) so that the axial movement of the seal ring 29 may be permitted.

Mounting conditions themselves of said two seal rings 28 and 29 are not different from the example (E) in FIG. 4. The feature of the present invention resides in the fact that in the mounting conditions of the seal rings 28 and 29 a part of the wall of the bearing casing 26 is enlarged between the two seal rings 28 and 29 to form a small chamber 31 which is communicated with the exterior of the bearing casing 26. That is, a hole 33 for communicating the small chamber 31 with the exterior of the bearing casing 26 is formed through the wall of the bearing casing 26, and said small chamber 31 is connected through a piping 32 connected to the hole 33 to a suitable place such as a gas outlet port of a turbine casing 34 or to the interior of an exhaust silencer. 35 is a turbine nozzle portion.

With the shaft sealing device with the above construction, the high pressure gas on the side of the turbine is first sealed by the seal ring 28. However part of the high pressure gas passes the clearance between the seal ring 28 and the groove and reaches the intermediate portion between the seal ring 28 and the seal ring 29. This gas is discharged exterior through the small chamber 31 the hole 33 and the piping 32 so that the pressure value is sufficiently lowered and consequently the pressure difference across the seal ring 29 may be decreased. As a result, only a very small amount of gas flows into the bearing casing 26. In this case, the seal ring 28 is limited in axial shift by the step 30 formed in the bearing casing 26 so that the seal ring 28 may be avoided from making into contact with the shaft 24. As has been explained the pressure difference across the seal ring 29 is less so that the wear due to the contact with the shaft 24 may be sufficiently prevented and the defects which the constructions shown in FIGS. 4(B) and (E) have may be avoided. Furthermore even when the clearance between the seal ring 28 and the ring groove is not so severely suppressed as in the case of the constructions shown in FIGS. 4(B), (C) and (F), the amount of gas leakage into the bearing casing may be sufficiently decreased.

FIG. 7 is a fragmentary view, on enlarged scale, illustrating another embodiment of the present invention which is different from said embodiment in that a small diameter step 36 is formed in the interior wall surface of the bearing casing 26 on the side of the low pressure side of the seal ring 29; that is on the side of the bearing 27, whereby the displacement of the seal ring 29 toward the bearing which is located opposite to the turbine wheel 25 may be limited. According to this embodiment, the high pressure gas from the side of the turbine wheel 25 is sealed by the seal ring 28, and part of the gas passes through the clearance between the seal ring 28 and the shaft 24 and reaches the portion intermediate between the seal rings 28 and 29 and then is discharged through the small chamber 31, the hole 33 and the piping 32 to the exterior so that the interior of the small chamber 31 may be maintained at low pressure, the pressure difference across the seal ring 29 is extremely low, and only a small amount of gas flows toward the side of the bearing 27 as in the case of the embodiment of FIGS. 5 and 6. In this embodiment, both the seal rings 28 and 29 are limited in their shift toward the side of the bearing 27 by the steps 30 and 36 so that the contact with the shaft 24 may be prevented and even when the dimensions of the clearances between the seal rings 28 and 29 and the ring grooves in the shaft are not so severe as in the prior art, the gas leakage may be reduced. Furthermore since the amount of gas passing the seal ring 29 is less and because of the reasons described above, the clearance with respect to the ring grooves of the shaft may be made greater so that the adhesion of lubricating oil in FIG. 4(F) is less.

FIG. 8 shows one example of the comparison experimental results between the devices of the present invention and the construction shown in FIG. 4(B) or (F). The solid line X shows the present invention; the one-dot chain line Y shows the case of the construction of FIG. 4(B); and the two-dot chain line Z shows the case of the construction of FIG. 4(F). From this figure it can be seen that the present invention is superior.

Because of the construction and functions, the device of the present invention have the following excellent effects:

(i) Since two seal rings are used and the gas is discharged from a small chamber formed intermediate between the two seal rings to the exterior thereby sufficiently reducing the pressure in this portion, an amount of gas leakage into the bearing casing may be extremely reduced as compared with the prior art devices.

(ii) Because of (i) above, in case of the use with a high turbocharger engine and a vehicle engine, the wear and decrease in tension due to the contact between the shaft of the turbocharger and the seal ring on the side of the turbine may be avoided and the reliability and lifetime of the shaft sealing device may be increased.

(iii) The shift of the seal ring disposed on the side of the high pressure may be prevented by the step formed in the bearing casing so that this seal ring will not make contact with the shaft and consequently the wear and the decrease in tension due to this contact may be avoided.

(iv) The clearance between the seal ring on the high pressure side and the ring groove in the shaft may be relatively increased so that dimensional and machining tolerances of the associated parts may be relaxed as compared with the prior art.

(v) Of the two seal rings, the seal ring on the low pressure side is also prevented by the step formed in the bearing casing from the displacement toward the high pressure side so that the contact between the seal ring and the shaft will not occur and consequently the wear and the decrease in tension due to this contact may be avoided.

What is claimed is:

1. In a turbocharger of the type wherein a shaft with a turbine wheel at one end and blower impeller at the other end is rotatably supported by bearings held in a bearing casing, a shaft sealing device for said turbocharger wherein two seal rings are disposed between the turbine wheel side and the bearing casing side of said shaft and each is supported by the interior wall of said bearing casing in stepped relation, the interior wall of the bearing casing between said rings being divided to provide a groove to form a chamber, a passage in the bearing casing connecting the chamber to a gas outlet port formed in the casing, steps having diameters smaller than the mounting dimensions of the seal rings formed on the interior wall of the bearing casing whereby said seal rings are prevented from displacement in an axial direction.

* * * * *